April 28, 1964          W. C. CLEAVELAND          3,130,707
AUTOMATIC FEEDING APPARATUS
Original Filed May 21, 1956                       6 Sheets-Sheet 3

INVENTOR.
WESLEY C. CLEAVELAND
BY
ATTORNEYS

April 28, 1964   W. C. CLEAVELAND   3,130,707
AUTOMATIC FEEDING APPARATUS
Original Filed May 21, 1956   6 Sheets-Sheet 4

INVENTOR.
WESLEY C. CLEAVELAND
BY
Moore, White & Burd
ATTORNEYS

INVENTOR.
WESLEY C. CLEAVELAND
BY
Moore, White & Burd
ATTORNEYS

United States Patent Office 3,130,707
Patented Apr. 28, 1964

3,130,707
AUTOMATIC FEEDING APPARATUS
Wesley C. Cleaveland, Maple Plain, Minn., assignor, by mesne assignments, to Vandale Corporation, Long Lake, Minn., a corporation of Minnesota
Original application May 21, 1956, Ser. No. 586,114, now Patent No. 2,981,402, dated Apr. 25, 1961. Divided and this application Aug. 15, 1960, Ser. No. 49,468
9 Claims. (Cl. 119—52)

This invention relates to new and useful improvements for apparatus for the automatic feeding of ensilage and the like, and particularly relates to new and useful improvements in automatic feeding apparatus including means for delivering material from a storage bin and cooperative means for receiving the delivered material and conveying it into extended or spread out relation as where it may readily be secured and eaten by farm or other animals.

This application is a division of application Serial No. 586,114, May 21, 1956, now Patent No. 2,981,402.

Broadly speaking the invention comprises means for delivering material from or for unloading a tank or bin such as a farm silo and cooperative means for receiving the material so unloaded or delivered and forcing it into extended or spread out relation. The means for delivering or unloading material from the silo comprises a mechanism rotatable on the top surface of ensilage within the silo for gathering ensilage from within the silo and ejecting it in a stream from the silo. The means for extending the material comprises a conveyor having a portion adapted to receive the stream of ensilage as discharged from the silo, the conveyor operating to convey the material to an extended position (such as a row) in cooperation with the operation of the unloader. In this structure means is provided for integrating the unloading and conveying means as well as new and useful conveying means.

It is therefore an object of this invention to provide a new and useful automatic feeding mechanism including means for gathering and delivering material in a stream from a silo or the like and cooperative means for receiving and conveying said stream of material to utilizable extension.

It is a further object of this invention to provide a new and useful animal feeding means wherein the means may be operator energized and automatically de-energized when a predetermined amount of feed has been delivered to utilizable position.

A further object of this invention resides in the new and useful control means for integrating the unloading and conveying means.

Still a further object of this invention resides in the new and useful improvements in the conveying means, including means whereby a stream of material may be received at one end thereof and simultaneously ejected and extended so that a row of material may be formed.

Still a further object of this invention resides in the improvement of an animal feeding means including a new and useful conveyor having novel supporting mechanism.

Also an object of this invention is to provide a new and useful bearing structure and in cooperation therewith.

Still other and further objects of this invention reside in the structural cooperation of the unloading and conveying means; in the means for providing integrated operation thereof; in the automatic de-energizing means; and in the structural details of the conveying means.

Other objects of this invention are inherent and apparent in the structure as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

This invention will be described with reference to the drawings, in which corresponding numerals refer to the same parts and in which.

Figures 1, 3:
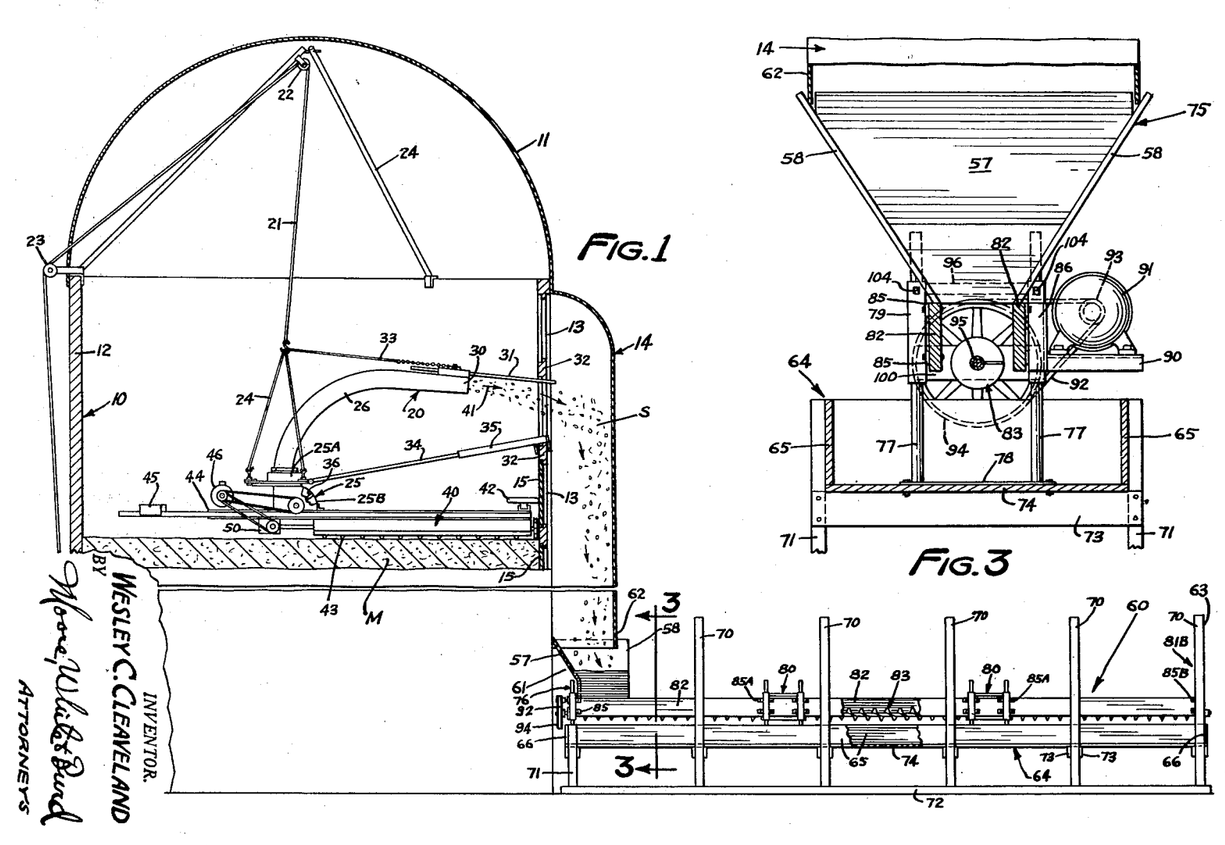
FIGURE 1 is a partly sectional and partly elevational view of a storage structure showing the automatic feeding means utilized in cooperation therewith.
FIGURE 3 is an enlarged vertical sectional view taken along the line and in the direction of the arrows 3—3 of FIGURE 1.
Figure 2:
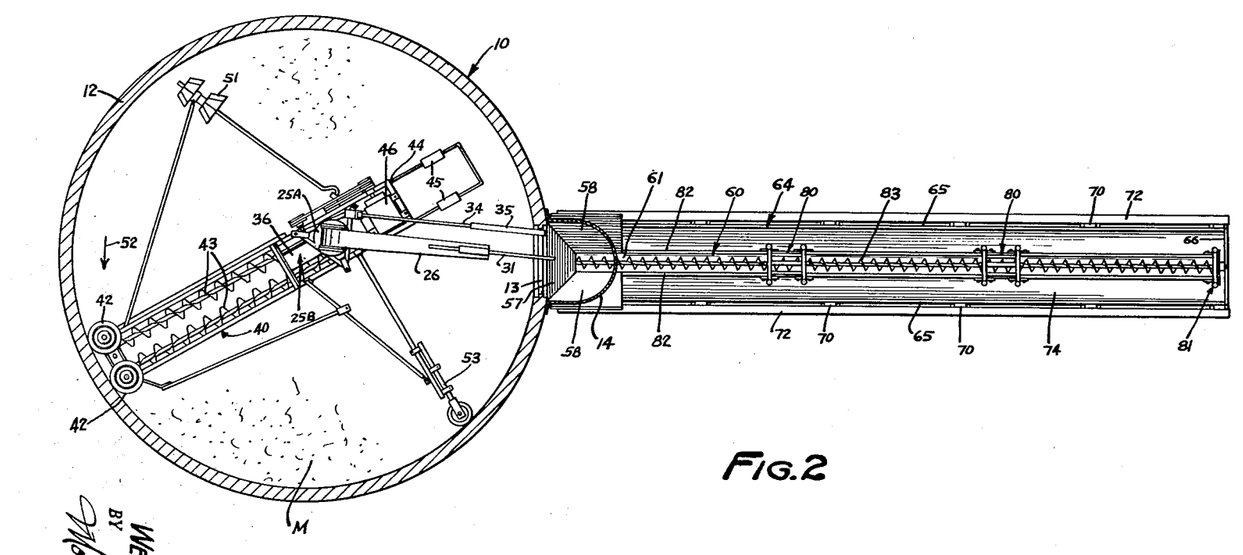
FIGURE 2 is a horizontal sectional view of the showing of FIGURE 1.

The structural storage container 10 with which this invention is adapted to be used is shown in FIGURE 1 as a silo of upright cylindrical construction. It is provided with a hollow hemispherical dome 11 and a vertical cylindrical wall 12. Disposed in vertical alignment in the wall 12 is a plurality of apertures 13 leading into the vertically extending exterior chute 14. The apertures 13 are provided with suitable means for retaining in place a plurality of doors 15 as illustrated with reference to FIGURE 1. As seen with reference to that figure, when the ensilage or other material M is stored in the silo, the doors which can be hinged or removable are placed in their corresponding apertures and retained therein by suitable means, usually the force of the packed material M alone being sufficient to so retain them.

While the silo has been described as a substantially upright circular cylinder, hollow, and having a hemispherical roof and with a plurality of vertically aligned doors leading to the outside chute, the automatic feeding apparatus of this invention may be used with other bins, tanks, etc. While preferably, the tanks, bins or the like are circular in horizontal cross-section, they may have other configuration.

The unloading apparatus, generally designated 20, in this instance comprises a silo unloader in communication with the surface of the material M. The unloader is suspended from a flexible cable suspending means 21 which cable is passed over sheaves 22 and 23 to the exterior of the silo and suitably secured to a winch or other means, not shown. Sheaves 22 and 23 are supported by a tripod 24 resting upon the top edge of the wall 12. The end of cable 21 interior of the silo is secured to a harness 24 in turn secured to the center housing assembly 25 of the silo unloader.

The silo unloader is provided with an arcuate ejection chute 26. Chute 26 is a three sided chute of U configuration having the open mouth of the U downwardly directed throughout the arcuate and horizontally extending portions of the chute. It terminates at one end 30 which end is spaced inwardly a substantial distance from wall 12. The other end of the chute is supported on the center housing structure 25. Chute 26 has secured thereto a rod 31 which has an end in engagement with the underside of one of the cross braces 32 between the doors 13 and a flexible member 33 including a chain and extension spring serves to support the chute 26 from the harness 24 as shown.

A stabilizing arm 34 has one end received in sleeve 35 in turn secured to one of the cross braces 32 and the other end pivotally attached about a horizontal axis to the center housing 25. This center housing comprises a stationary portion 25A and a portion which may be rotated 25B. The stabilizing arm 34 serves to retain the portion 25A against rotation.

Housing portion 25B encloses an impeller 36 for receiving material gathered by the collecting arm 40 for engaging it and impelling it in a direction upwardly and outwardly of the silo as determined by the confinement of the chute 26 and shown by arrow 41. The collecting arm 40 is provided with a wall engaging wheel means 42 for contacting the wall of the silo, a plurality of augers 43 for engaging the surface of the ensilage and bringing it into the impeller 36, all supported from a frame 44, the frame 44 provided at its opposite end with a counterweight 45. A motor 46 through belting serves to actuate the impeller 36 and the augers 43, receiving current from any suitable source through contact ring assemblies, not shown, comprising part of housing portions 25A and 25B.

Motor 46 through gear box 50 also serves to drive hubs 51 which propel the unloader over the surface of ensilage in the direction of the arrow 52 for operation.

An advance guide wheel assembly 53 engages the wall of the silo for directing the movement of the unloader as it rotates within the silo.

There is thus provided a pendently suspended silo unloader having a collecting arm comprising helical flight or auger members positioned upon the surface of ensilage within the silo and driven for rotation about an interior end within the silo, the helical flight means engaging the ensilage and conveying it to adjacent the center of the silo from whence it is forced into communication with the impeller and impelled from the silo by confinement with the ejection chute, taking the form of an arcuate stream S which falls from the silo as indicated in FIGURE 1.

The silo unloader may be of several different types and will not be described further in detail. If desired, the silo unloader of the type shown in Patent No. 2,719,058, issued September 27, 1955, may be used. The silo unloader illustrated is of the type exemplified in co-pending application Serial No. 566,696, filed February 20, 1956.

The conveying apparatus or means generally designated 60 is supported in linear extension with one end 61 positioned under the bottom 62 of exterior chute 14 to receive material therefrom and the other end 63 positioned in extended relation thereto. Material is guided from the chute by wings 57 and 58 secured together to form a hopper and supported on side bars 82 or otherwise as desired. It comprises a bunk 64 having side walls 65 and end walls 66 joined to make a rectangular enclosure supported upon a plurality of pairs of uprights 70 and 71, and provided with a floor 74. Each of the pairs of uprights 70 comprises spaced members, secured at the bottom end to base plate or frame member 72 and having parallel cooperating cross bars 73 secured at each end thereto and to each side thereof to support the bottom 74 of the bunk 64 and to which the walls 65 and 66 are secured.

The pair of uprights or members 71 is identical with the pair of members 70 except terminated at the top edge 74 of side walls 65 rather than extending therebeyond, which is necessitated by the configuration of chute 75 as subsequently explained.

Positioned on the floor 74 and within the bunk 64 are frames 76, 80 and 81. Each of the frames 76, 80 and 81 are substantially identical but with certain modifications as discussed.

The frames serve to support side plates or bars 82 for vertical adjustment as well as the conveyor 83 and motor 91.

Frame 76 comprises a pair of spaced uprights 77 secured to a base plate 78, the base plate usually being bolted to floor 74. In this instance, each of the uprights 77 is of hollow tubular or pipe construction. Each member 77 has a sleeve 79 adjustably slideable thereon but which may be locked thereto as later explained. Placed in spaced vertical relation and affixed to each one of the sleeves 79 are two strap members 85 which being welded to sleeves 79 at one end thereof form extending flanges for securing the sleeves to the side bars 82 as shown in FIGURE 1. Members 85 are secured at one end to the sleeves 79 for frame 76 and extend in the direction of the center of the conveyor or rightwardly with reference to FIGURE 1.

Joined by welding or otherwise to one of the sleeves 79 and its respective members 85, in this instance the rightward upright 77 with respect to FIGURE 3, is a vertically extending channel member 86 welded to upright 77 and members 85 at one flange and opening rightwardly with reference to FIGURE 3. Superimposed apertures are provided for cooperation with the apertures in members 85 so that side plate 82 may be bolted in juxtaposition to members 85 and channel 86. Welded to each one of the flanges of the channel 86 and extending at right angles thereto in horizontal parallel extension are two angles 90 which serve to support the motor 91 which is usually bolted thereto. A plurality of holes may be provided on each one of the angles 90 as may an elongated slot whereby the motor 91 may be positioned rightwardly or leftwardly with reference to FIGURE 3 for tightening the belt 92. Belt 92 is driven by motor 91 through a sheave 93 of smaller diameter and in turn drives sheave 94 of larger diameter which is connected to shaft 95 of the conveyor 83 for driving the same.

Each of the sleeves 79 is connected by a tubular cross bar 96 at the top thereof and by a bearing plate 100 at the bottom thereof. Plate 100 serves to support bearing 101 for shaft 95 and thus to support one end of the conveyor 83. A set screw 104 is positioned in each one of the sleeves 79 to engage uprights 77. Thus, the sleeves 79, cross bar 96 and bearing plate 100 may be moved upwardly and downwardly as a unit and positioned in juxtaposition by set screws 104 for determining the vertical position of side plates or bars 82.

Figure 4:
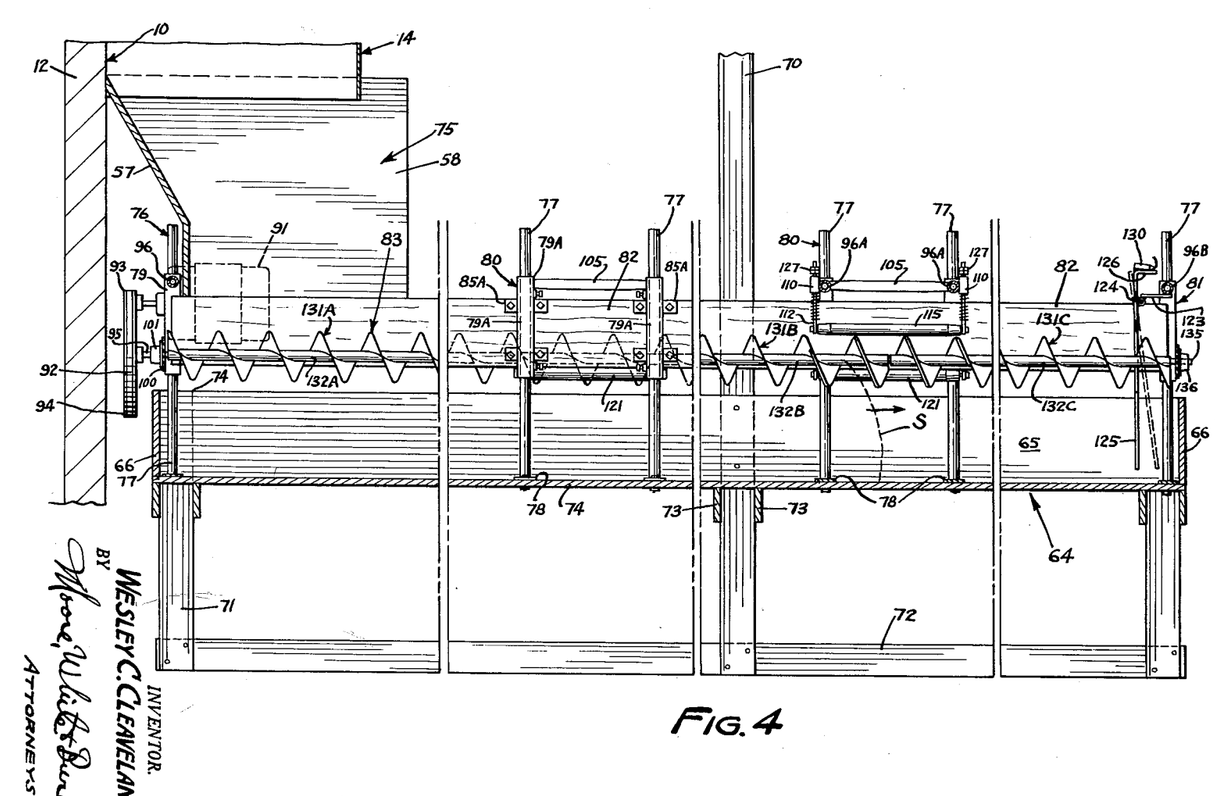
FIGURE 4 is an enlarged fragmentary elevational view, partially in vertical section, of the conveying means of FIGURE 1.

Frames 80 are substantially similar to frame 76 except positioned in pairs as shown best in FIGURE 4 and modified as now explained. Each of the frames 80 has the uprights 77, and sleeves 79A similar to sleeves 79 but in this instance each one of the sleeves 79A is secured to the side bars 82 by two strap members joined at the middle to sleeve 79A to form double-ended flange members 85A as shown. Each of frames 80 is likewise provided with the base plate 78. To each of the sleeves is secured a cross bar 96A, similar to bar 96, but has no plate similar to plate 100.

Figure 5:
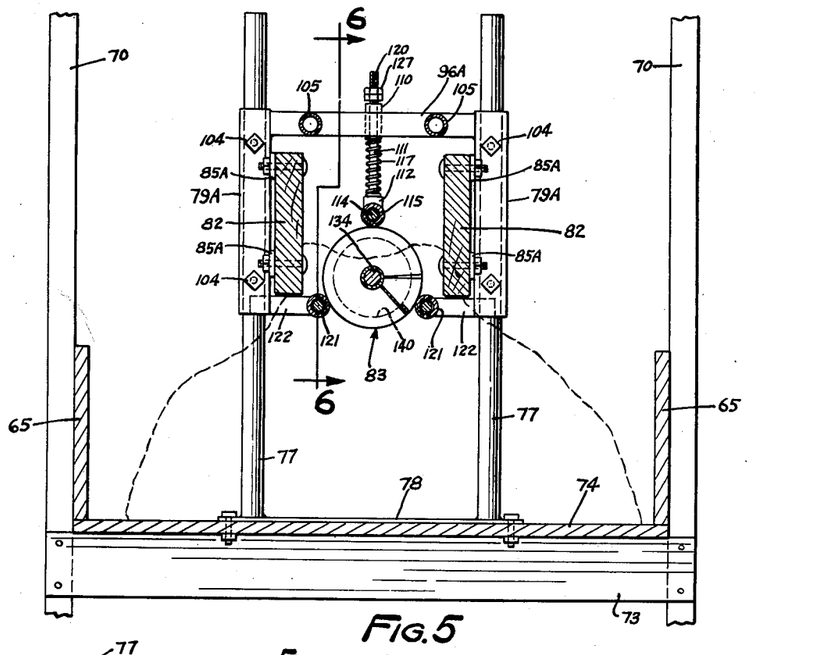
FIGURE 5 is a fragmentary vertical sectional view, taken along the line and in the direction of the arrows 5—5 of FIGURE 6, and showing the conveyor and supporting means of the instant invention.

In this instance the cross bars 96A for each member of a cooperating pair of frames 80 is joined by a pair of tubular braces 105 as shown best in FIGURE 5. Each of the tubular braces 105 is joined at each end to a crossbar 96A and is positioned at a point approximately midway between the center of the bar 96A and the end thereof so that members 105 and 96A when viewed in plan view form a frame somewhat in the shape of a roman numeral II. Secured exteriorly of each of members 96A for each pair of frames 80 and midway between braces 105 is a sleeve 110 positioned in vertical extension to serve as a guide for a rod member 111. The vertical extension of the sleeves 110 is parallel and they are also positioned in a plane parallel to the longitudinal plane of the conveyor as will be seen best with references to FIGURES 5 and 6. The bottom end 112 of each of the rods 111 is apertured to receive bolt 113 which bolts support axle 114 for elongated roller 115. Elongated roller 115 serves as a bearing surface as subsequently explained and is preferably provided with a resilient covering or coating 116 of rubber or synthetic resinous material for cooperation with the steel of conveyor 83.

Figure 6:
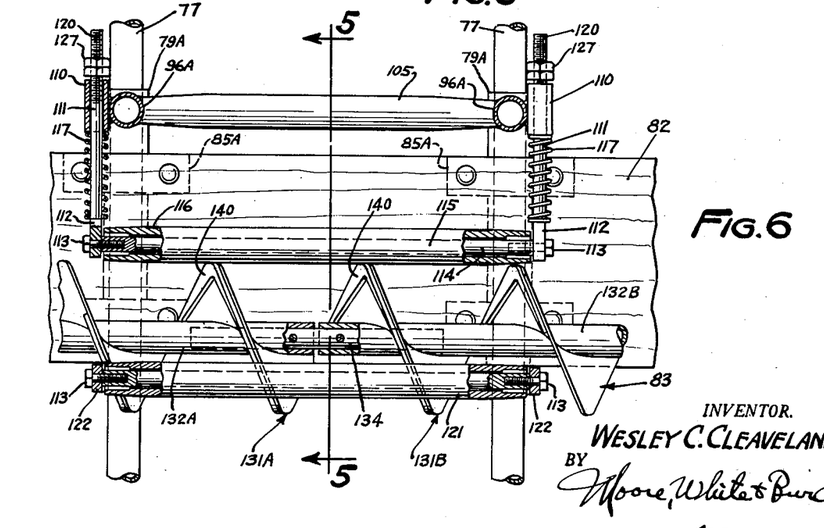
FIGURE 6 is a vertical sectional view taken along the line and in the direction of the arrows 6—6 of FIGURE 5.

Ends 112 are enlarged and a compression spring 117 is positioned to engage the enlargement and the underside of sleeve 110 to bias the rods 111 and consequently bearing 115 is a downward direction with reference to FIGURE 6.

The upper end 120 of each rod 111 is threaded and provided with a pair of nuts 127 which may be adjusted upwardly and downwardly to serve by engagement with the upper end of sleeve 110 to limit the downward biasing on end of bearing member 115.

A pair of bearing members 121, which are identical with member 115 but positioned to form a triangle in cooperation therewith as shown best in FIGURE 5, are supported at each end by a horizontal bearing support 122, one support welded at one end to the exterior of a sleeve 79A for each frame 80 and provided with an aperture at the other end for supporting bolt 113.

The conveyor 83 is thus cradled between three roller bearing members forming a triangle, the apex member 115 of which is biased into communication with the conveyor but free to rise as the occasion demands. If desired, the member 115 may be slightly spaced in initial or datum position with reference to the conveyor 83 so that the conveyor 83 normally rests upon members 131 and only engages member 115 when thrown upwardly by encounter with a foreign object, when there is a clogging, etc.

Frame 81 is similar to frame 76 as shown but in this instance the members 85B supporting side plates 82 which are similar to members 85 extend inwardly or leftwardly with reference to FIGURE 1. Further, there is provided secured to the underside of cross brace 96B a supporting arm 123 having pivoted thereto at 124 a depending elongated actuator 125 having a turned end 126 on which is positioned a mercury switch 130. As may be seen with reference to FIGURE 4, actuator 125 normally hangs in vertical position, but when engaged by a moving mass of ensilage S will be forced from the full to the dotted line position of FIGURE 4 pivoting about pivot 124 whereupon the mercury switch 130 will be moved to de-energized position as subsequently explained.

The conveyor 83 comprises a plurality of helical flight members, in this instance three in number, members 131A–C. Each is provided with a tubular supporting shaft 132A–132C. Shaft 132A for member 131A is pinned at its left end (FIGURE 4) to shaft 95 for rotation thereby. The right end of shaft 132A and the left end of shaft 132B are secured to a stub shaft 134 so that flight sections or members 131A and 131B rotate as a unit as seen in FIGURE 6.

The right end of shaft 132B and the left end of shaft 132C are likewise pinned to a shaft 134, so that the entire flight 131A–131C rotates as a unit. A stub shaft 135 is journalled for rotation in end bearing 136 and is pinned to the rightward end of shaft 132C, also as shown in FIGURE 4.

There is thus provided a helical flight comprising three independent flight sections 131A–131C each secured to a tubular shaft member 132A–132C and supported at its ends by stub shafts. At the terminal ends of each of this flight member, the stub shafts are supported by bearings and one of the stub shafts is provided with a sheave for rotation. The intermediate helical flight portion is thus secured to the end flight portions by stub shafts so that the entire flight rotates as a unit, driven from one end thereof.

The right end of flight section 131A, the ends of flight section 131B and the left end of flight section 131C have secured thereto a ribbon 140 as shown best in FIGURE 6. This ribbon is provided for one or two turns and is co-terminous with the periphery of the flight section to provide a thickened or enlarged exterior surface therefor. The cooperating ends of adjacent flight sections are positioned in only slightly spaced relation so that a substantially continuous flight is provided.

Thus, as will be seen with reference to FIGURES 4, 5 and 6, the ends of the flight sections, other than the ends providing the terminal ends of the entire flight, are provided with the thickened peripheral portions supported by the rollers 115 and 121 for rotation therein.

A pair of frames 80 is positioned so that these thickened peripheral portions are cradled in the rollers 115, 121.

Figure 7:
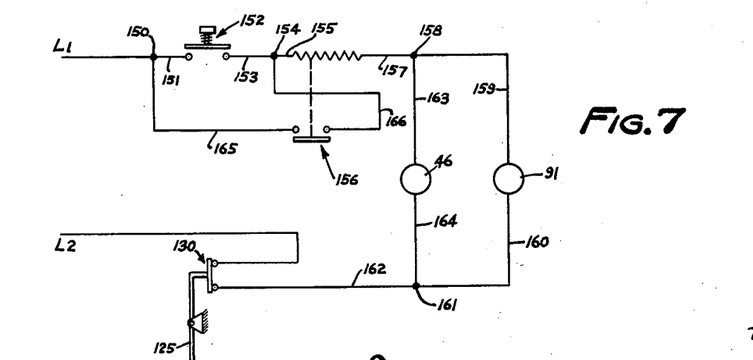
FIGURE 7 is a circuit diagram showing the electrical connections between the unloading and conveying means and the automatic stop switch therefor.

With reference now to FIGURE 7, this figure shows the wiring diagram for the circuit controlling the operation of the unloader and conveyor in cooperation. In this figure, there is shown lines L1 and L2 connected to any suitable source of current supply. Line L1 is connected to a junction 150 and thence through line 151 to one of the normally opened contacts of start switch 152, the other of which is connected via line 153, junction 154 and line 155 to the coil of a relay 156, and thence through line 157, junction 158 and line 159 to motor 91. From motor 91 the circuit continues via line 160 to junction 161 and thence via line 162 to one of the normally closed contacts of switch 130 and thence to line L2. Thus, when switch 152 is actuated to close the normally opened contacts a circuit is established to the coil of relay 156 and motor 91 when switch 130 is in the normally closed or operative position. At the same time a circuit is established from junction 158 via line 163 to motor 46 from whence it continues via line 164 to junction 161. Thus, motor 46 for the unloader is likewise energized at this time and consequently both the conveyor and unloader will commence to operate by energization of the motors 46 and 91.

Energization of the coil of relay 156 actuates to close the normally opened contacts which establishes a holding circuit from junction 150 via line 165 and line 166 to junction 154. When switch 152 is released to its normally open position, a holding circuit is thus established and the motors 46 and 91 will continue to run as long as the switch 130 is in the position shown in FIGURE 7, when the actuator 125 is in the full line position of FIGURE 4. When the ensilage S of FIGURE 4 has advanced in extended relation by the operation of the conveyor so that it engages the actuator arm 125 and pushes it from the full to the dotted line position of FIGURE 4, the contacts of switch 130 will be opened breaking the circuit to the coil of relay 156 thus opening the relay contacts and also breaking the circuits to motors 46 and 91. Thus the motors will stop and both the unloader and the conveyor will likewise stop.

Subsequent actuation of switch 152 will establish no circuit as long as the member 125 is in the dotted line position of FIGURE 4 since the contacts of switch 130 will be opened. When the ensilage is removed (when being fed to the animals) so that the member 125 may swing by gravity to the full line position of FIGURE 4, contacts of switch 130 will again be closed and actuation of switch 152 will reestablish the circuit.

Figure 8:
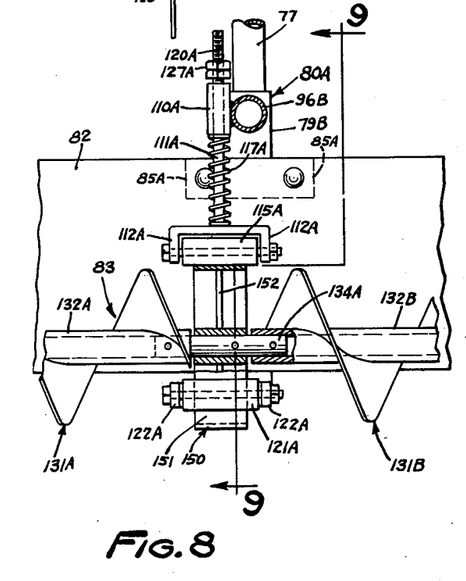
FIGURE 8 is a fragmentary view similar to FIGURE 5 showing a modified form of conveyor supporting means for this invention.
Figure 9:
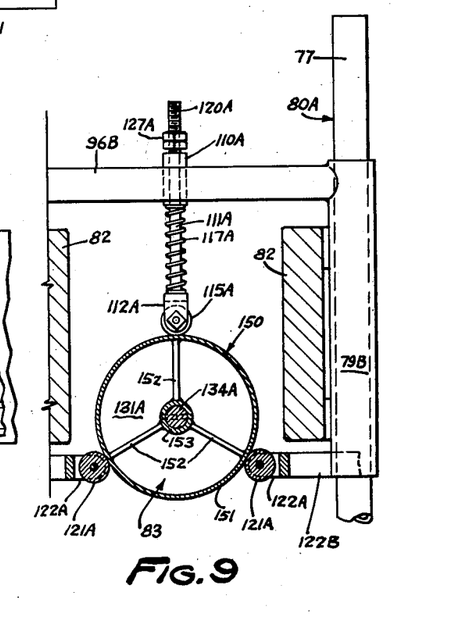
FIGURE 9 is a view taken along the line and in the direction of the arrows 9—9 of FIGURE 8.

Reference now to FIGURES 8 and 9 shows a modified conveyor bearing structure. Since the bearings for supporting the cooperating or juxtaposed ends of flights 131A, 131B and 131C are identical, the bearing will only be explained with reference to the cooperating ends of flights 131A and 131B. In this instance the ends of shaft 132A and 132B are pinned in spaced relation to a stub shaft 134A. Also pinned to stub shaft 134A is a spider 150 having an arcuate peripheral bearing surface 151 supported by three spaced rods 152 from a center collar 153 which collar is pinned to shaft 134A. In this instance only one frame 80A is needed similar to frame 80, and cross bar 96B is secured directly to sleeves 79B similar to sleeves 79A. The vertically extending sleeve 110A is similar to sleeve 110 but has an aperture square in cross section and supports a square rod 111A similar to rod 111 and provided with a spring 117A identical with spring 117. The upper end of the rod is threaded at 120A similar to end 120 and is provided with nuts 127A similar to nuts 127.

The bottom end of the rod 111A is provided with spaced bifurcated ends 112A which serve to support a roller 115A serving as a bearing.

A pair of bearing members 121A identical with members 115A are likewise positioned to form a triangle in cooperation with the bearing surface 150 and are supported by a pair of bifurcated ends 122A supported by horizontal bearing supports 122B from sleeves 79B.

Figure 10:
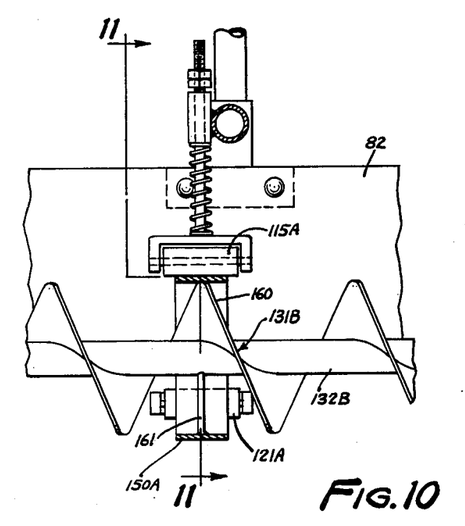
FIGURE 10 is a view similar to FIGURE 5 but showing a second modified form of conveyor supporting means of the instant invention.
Figure 11:
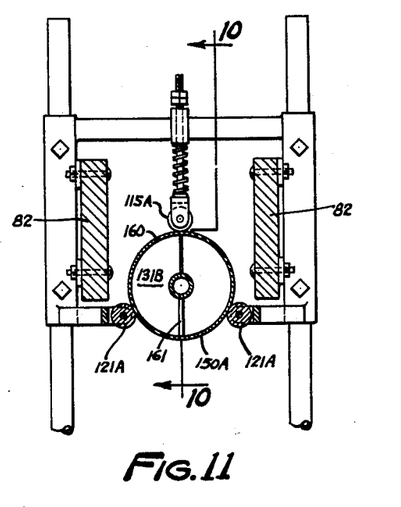
FIGURE 11 is a view taken along line and in the direction of the arrows 11—11 of FIGURE 10.

A second modification as shown in FIGURES 10 and 11 in which modification a bearing surface 150A similar to surface 150 is provided and likewise engages rollers 115A and 121A. In this instance, however, surface 150A is supported by securing it to a portion 160 of a flight section (in this instance flight section 131B) at one side thereof and providing an oppositely disposed supporting rod member 161 for supporting the other side thereof.

Figure 12:
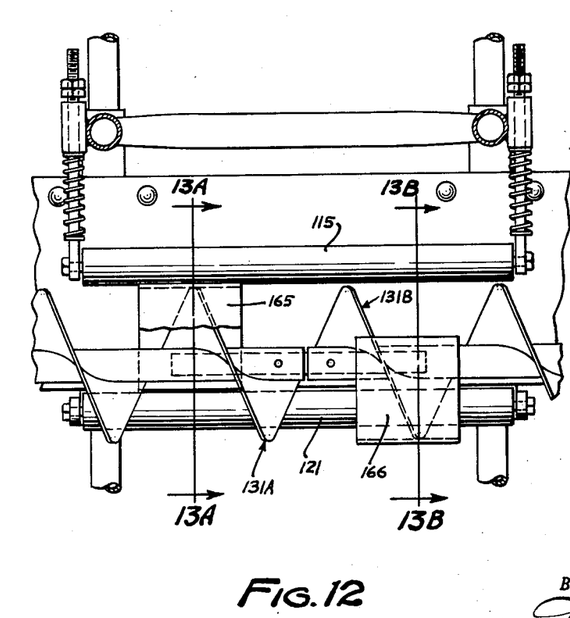
FIGURE 12 is likewise a view similar to FIGURE 5 and showing a third modified form of supporting means of the instant invention.
Figure 13A:
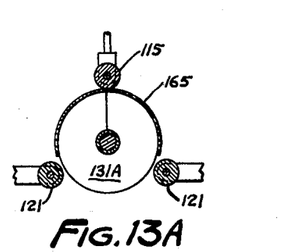
FIGURES 13A and 13B are views taken along the line and in the direction of the arrows 13A—13A of FIGURE 12 but with parts vertically separated for clarity of illustration.
Figure 13B:
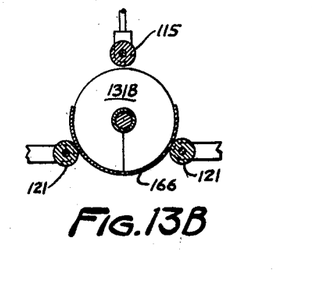

In FIGURES 12 and 13A and 13B is shown still a different modification in which the bearing members 115 and 121 are utlized but in which a pair of semi-circular members 165 and 166 are provided. These members comprise slightly more than half a circle as shown in FIGURE 13 and are secured in spaced relation to the ends of adjacent flight sections, as shown, 131A and 131B.

Thus, in this modification there is provided a plurality of extending rollers forming a bearing triangle, the conveyor flighting positioned within the triangle formed by the rollers and spaced semi-circular bearing members secured in opposed relation to the flighting of the auger to communicate with the bearing members so that an arcuate surface is in communication with each one of the three bearing members at all times while there is not provided a circular confine which would obstruct the flow of material through the conveyor.

In operation, when switch 152 is energized the holding circuit will be established and power will be continued to be delivered to motors 46 and 91 as long as the member 125 is in the full line position of FIGURE 4, in which position it normally rests when the bunk is empty. Energization of motor 46 will commence to drive hub 51 which will cause the collecting arm 40 to rotate about its interior end, guided by the wall engaging means 42 and advance guide wheel assembly 53. The actuation of motor 46 will also cause the augers 43 to engage the ensilage and bring them into impeller 36. The impeller 36 is likewise rotated by the motor 46 and will engage the so brought in ensilage to eject it through the chute 26. The ensilage so guided will be directed from the apertures 13 as shown in the direction of the arrow 41 falling within the exterior chute 14 into the end 61 of bunk 64 at which point it will engage the auger 83 which conveys it from left to right in the bunk with reference to FIGURE 1 and thus into engagement with member 125 moving it from the full to the dotted line position of FIGURE 4, breaking the circuits and de- energizing both motors 46 and 91 and thus the silo unloader and the conveyor. The wings 57, 58 serve to guide the ensilage from bottom 62 of chute 14 into the end 61 of the conveyor 60. The side bars 82 may be adjusted upwardly and downwardly by releasing set screws 104 until they reach proper position and then immobilized by tightening the screws. The position of the side bars will determine the relative height to which the ensilage will build as shown in FIGURE 5. Adjustment of the side bars of course carries with it adjustment of the frames 76, 80 and 81 which likewise causes the conveyor 60 to be raised and lowered. The triangular bearings 121 and 115 will engage the periphery of the flight or auger 83 throughout the portions provided with the ribbons 140 and the cushioning material 116 will absorb shocks or irregularities in the surface thereof. Thus, there is provided a channel or tunnel defined by the periphery of the conveyor through which the ensilage may flow without impediment. If extraneous objects should encounter the bearing structure or should there become a compacted mass of material, the bearing 115 may rise by virtue of the action of springs 117.

The operation of the bearing modification shown in FIGURES 8 and 9 is similar except that the bearings 115A and 121A ride on the arcuate surface 150 as the surface 150 rotates with the auger 83 and the spaced members 152 likewise rotate. The operation of the modification shown in FIGURES 10 and 11 is likewise similar to the operation of the modification shown in FIGURES 12 and 13. In the operation of the modification shown in FIGURES 12 and 13, however, there are two members positioned in spaced opposed relation for engaging the bearings 115 and 121 so that an arcuate bearing surface engages each of the members at all times although it is not a continuous arcuate bearing surface and therefore does not engage bearing members in the same plane.

It is apparent that many modifications and variations of this invention as hereinbefore set forth may be made without departing from the spirit and scope thereof. The specific embodiments described are given by way of example only and the invention is limited only by the terms of the appended claims.

What is claimed:

1. An animal feeding device or the like comprising in combination means adapted to be positioned upon the surface of stored material within a silo and for laterally ejecting the same from the silo, means for guiding said ejected material downwardly in a stream, means for conveying said material into extended position and having a portion positioned beneath said means for guiding said material downwardly to receive said stream of ensilage, and said means for conveying said ensilage into extended position having a terminal portion thereof, said means for ejecting said material laterally from the silo comprising motor means for operating the same, said means for conveying said material comprising motor means for operating the same, switch means positioned at said terminal portion for terminating the operation of both said motor means upon engagement by conveyed material, and a manually manipulatable switch interconnected with said switch means for initiating operation of said motor means when said switch means is not engaged by conveyed material.

2. The structure of claim 1 further characterized in that said means for extending the material comprises a continuous linear conveyor having one end positioned under said stream of ensilage and the other end in extended relation thereto to provide a gradually extending mass of ensilage.

3. The animal feeding means of claim 1 further characterized in having a relay means provided in the circuit for said motor means, said switch means being connected in series with said relay means, said relay means including a holding circuit, and said manually manipulative switch being connected in parallel to the holding circuit of said relay means for momentarily actuating said relay and completing said holding circuit.

4. The animal feeding means of claim 1 in which said means for conveying ensilage into an extended position includes an open trough and an open spreading means spaced above said open trough.

5. In combination, a vertically extending silo, an unloading means positioned within said vertically extending silo engaging the surface of said silo and the ensilage therein, said unloading means removing ensilage from said surface and laterally ejecting it through the silo wall, said silo wall being provided with aperture means through which said ensilage may be ejected, a downwardly extending confine exterior of and communicating with said aperture means for directing the ensilage ejected therefrom downwardly in a stream, said confine having an open end at the bottom thereof, continuous conveyor means having a portion positioned within said open end of said confine and a portion in extended relation thereto, said conveyor means serving to provide a gradually extended mass of ensilage, said unloading means adapted to be positioned within the silo and said conveyor means each having an electric motor for the operation thereof, a switch positioned at said extending end of said conveyor means adapted to be engaged by the ensilage as it progresses in extended relation for movement from a first to second position, said switch when in second position serving to disengage said electric motors.

6. An animal feeding device including in combination, an open trough, a storage means, means positioned adjacent one end of said open trough for conveying material from said storage means to said adjacent end of said open trough, means mounted above said open trough for depositing said material conveyed to said open trough along its length, said conveying means and said depositing means each being powered by a motor, a relay switch interposed in the circuit for both of said motors, a holding circuit for said relay, a manually controlled switch in a circuit in parallel with said holding circuit for actuating said relay and holding circuit, and switch means at the end of said open trough most remote from the point thereon to which materials are conveyed to said open trough from said storage means by said conveying means, said switch means being engageable by materials being deposited in said trough by said depositing means and electrically connected to said holding circuit for terminating operation thereof when said switch means is engaged by materials being deposited in said open trough.

7. An animal feeding device according to claim 6 in which said means for depositing material along said trough is an open helical flight.

8. An animal feeding device or the like comprising in combination, an ensilage storage unit, means for removing ensilage from the top surface of the material stored in the storage unit and delivering it to the lower reaches of said storage unit, means for conveying ensilage into extended position, said conveying means having one end positioned near said storage unit, means for placing ensilage delivered to the lower reaches of said storage unit into the near end of said conveying means, said conveying means having a terminal portion spaced from said near end, said means for removing ensilage from said storage unit and said conveying means being driven by motors, switch means positioned at the terminal portion of said conveying means for terminating the operation of said motors upon engagement of said switch means by conveyed ensilage, and an initiating switch for commencing operation of said motors when said switch means is not engaged by conveyed ensilage.

9. The structure of claim 8 further characterized in that said means for conveying ensilage comprises an animal feeding trough and a conveyor extending the length thereof for depositing ensilage throughout the length of said feeding trough in a substantially unbroken mass, said switch means at the terminal portion of said conveying means functioning to terminate motor operation when said feeding trough has ensilage therein throughout its length.

References Cited in the file of this patent

UNITED STATES PATENTS

| | | |
|---|---|---|
| 2,406,886 | McBean | Sept. 3, 1946 |
| 2,445,056 | Cordis | July 13, 1948 |
| 2,615,424 | Spickler | Oct. 28, 1952 |
| 2,646,023 | Virgil | July 21, 1953 |
| 2,714,950 | Rubin | Aug. 9, 1955 |
| 2,791,887 | Hennig | May 14, 1957 |